(12) United States Patent
Masser

(10) Patent No.: US 8,749,700 B2
(45) Date of Patent: Jun. 10, 2014

(54) COMBINED CAMERA AND FLASH LENS

(75) Inventor: Paul Masser, Heidelberg (CA)

(73) Assignee: Blackberry Limited, Waterloo, Ontario (CA)

( * ) Notice: Subject to any disclaimer, the term of this patent is extended or adjusted under 35 U.S.C. 154(b) by 23 days.

(21) Appl. No.: 13/478,333

(22) Filed: May 23, 2012

(65) Prior Publication Data

US 2013/0314582 A1 Nov. 28, 2013

(51) Int. Cl.
*H04N 5/225* (2006.01)

(52) U.S. Cl.
USPC .......................................... 348/371; 348/374

(58) Field of Classification Search
USPC ................................. 348/370–374
See application file for complete search history.

(56) References Cited

U.S. PATENT DOCUMENTS

| | | | |
|---|---|---|---|
| 6,895,705 B2 | 5/2005 | Hillstrom | |
| 7,306,960 B2 | 12/2007 | Bogner | |
| 7,399,220 B2 | 7/2008 | Kriesel | |
| 7,927,028 B2 * | 4/2011 | Chan | 348/371 |
| 2003/0137642 A1 | 7/2003 | Uchiyama et al. | |
| 2003/0227547 A1 | 12/2003 | Iddan | |
| 2005/0107117 A1 | 5/2005 | Makino | |
| 2006/0138304 A1 | 6/2006 | Ma | |
| 2007/0213103 A1 | 9/2007 | Zaitsu | |
| 2007/0242134 A1 | 10/2007 | Zernov | |
| 2007/0291164 A1 * | 12/2007 | Goh et al. | 348/370 |
| 2008/0080850 A1 * | 4/2008 | Amirzadeh et al. | 396/155 |
| 2009/0137274 A1 * | 5/2009 | Kim et al. | 455/556.1 |
| 2009/0147381 A1 | 6/2009 | Chen | |
| 2009/0153729 A1 | 6/2009 | Hiltunen | |
| 2011/0122554 A1 | 5/2011 | Ramrattan | |
| 2012/0018323 A1 * | 1/2012 | Johnson et al. | 206/320 |
| 2012/0327565 A1 * | 12/2012 | Tages et al. | 361/679.01 |

FOREIGN PATENT DOCUMENTS

| | | |
|---|---|---|
| CN | 202035072 | 11/2011 |
| EP | 1 803 387 | 7/2007 |
| GB | 2 278 459 | 11/1994 |
| JP | 2005026881 | 1/2005 |
| JP | 2005039670 | 2/2005 |

OTHER PUBLICATIONS

Extended European Search Report dated Jan. 22, 2013, Application No. 12169031.7.
EPO, Extended European Search Report relating to Application No. 12188394.6, dated Dec. 20, 2013.
USPTO, US Office Action relating to U.S. Appl. No. 13/622,834 dated Mar. 13, 2014.
USPTO, US Office Action relating to U.S. Appl. No. 13/622,834, dated Dec. 4, 2013.

* cited by examiner

*Primary Examiner* — Gevell Selby

(57) ABSTRACT

Disclosed is an electronic device, comprising an image sensor; a flash; a lens having a flash portion for covering the flash, an image sensor portion for covering the image sensor and an etching for reducing optical interference at the image sensor from the flash; and, a housing for housing the image sensor and the flash.

19 Claims, 6 Drawing Sheets

COMBINED CAMERA AND FLASH LENS

FIELD

The present disclosure relates to electronic devices having cameras and, more particularly, to electronic devices having a combined camera and flash lens.

BACKGROUND

Electronic devices, such as smartphones and tablet computers, are sometimes equipped with cameras. Cameras may be used to allow a user to capture a video or a still photograph. Flashes are often used with cameras. Light emanating from such flashes can cause interference (or "crosstalk") with the camera's image sensor.

BRIEF DESCRIPTION OF THE DRAWINGS

Reference will now be made, by way of example, to the accompanying drawings which show example embodiments of the present application and in which.

Like reference numerals are used in the drawings to denote like elements and features.

DETAILED DESCRIPTION

Described is an electronic device, comprising an image sensor; a flash; a lens having a flash portion for covering the flash, an image sensor portion for covering the image sensor and an etching for reducing optical interference at the image sensor from the flash; and, a housing for housing the image sensor and the flash. In another aspect, the etching can be a laser etching. In another aspect the housing defines a first opening and a second opening, and the lens is configured such that the flash portion is aligned with the first opening for allowing light to pass therethrough and the image sensor portion is aligned with the second opening for allowing light to pass therethrough.

According to another aspect of the present matter, described is a lens for a camera, the camera having a flash and an image sensor, the lens comprising a flash portion for covering the flash, an image sensor portion for covering the image sensor and an etching for reducing optical interference at the image sensor from the flash.

According to another aspect of the present matter, described is a camera assembly, comprising a flash; an image sensor; and, a lens comprising a flash portion for covering the flash, an image sensor portion for covering the image sensor and an etching for reducing optical interference at the image sensor from the flash.

Other example embodiments of the present disclosure will be apparent to those of ordinary skill in the art from a review of the following detailed descriptions in conjunction with the drawings.

Example Electronic Devices

Figure 1:
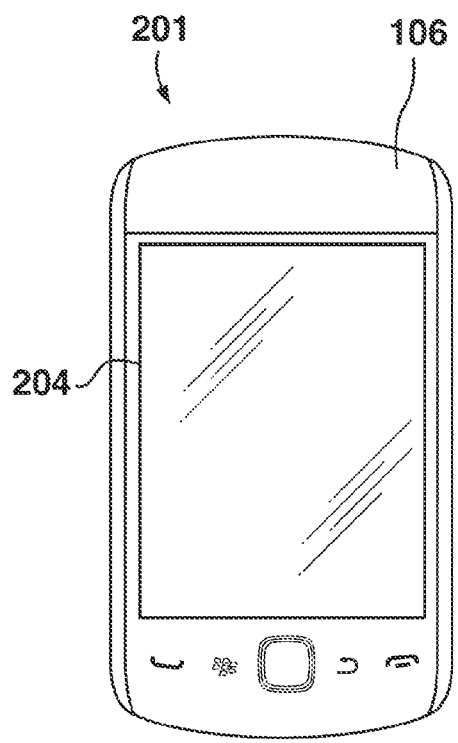
FIG. 1 is a front view of an example electronic device in accordance with example embodiments of the present disclosure.

Referring first to FIG. 1, a front view of an example electronic device 201 is illustrated. The electronic device can be a mobile phone, portable computer, smartphone, tablet computer, personal digital assistant, a wearable computer such as a watch, a television, a digital camera or a computer system, for example. The electronic device may be of a form apart from those specifically listed above.

FIG. 1 illustrates a front view of the electronic device 201. The front view of the electronic device 201 illustrates a front face 106 of the electronic device 201. The front face 106 of the electronic device 201 is a side of the electronic device 201 which includes a main display 204 of the electronic device 201. The front face 106 of the electronic device 201 is a side of the electronic device 201 which is configured to be viewed by a user.

Figure 2:
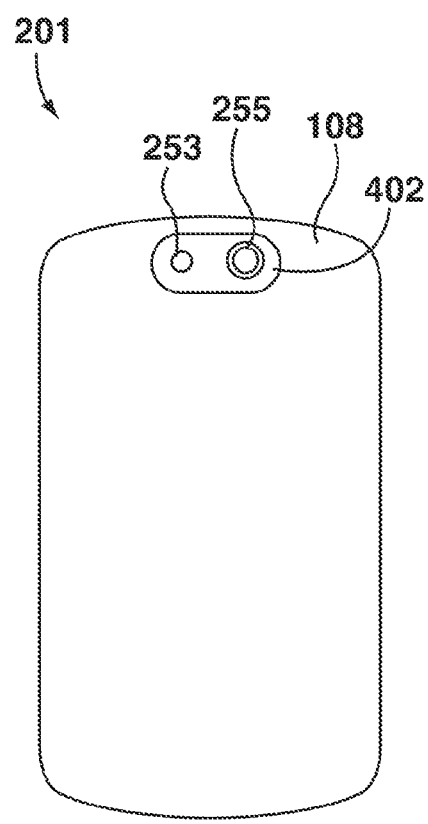
FIG. 2 is a rear view of the example electronic device of FIG. 1 in accordance with example embodiments of the present disclosure.

FIG. 2 illustrates a rear view of the electronic device 201. The rear view of the electronic device illustrates a rear face 108 of the electronic device 201. The rear face 108 is a side of the electronic device 201 which does not include a main display 204 of the electronic device 201. In the embodiment illustrated, the rear face 108 is a side of the electronic device 201 which is opposite the front face 106 (FIG. 1) of the electronic device 201. That is, the rear face 108 may be substantially parallel to the front face 106 of the electronic device 201.

The electronic device 201 includes one or more cameras 253. The cameras 253 are configured to generate camera data, such as images in the form of still photographs and/or motion video. The camera data may be captured in the form of an electronic signal which is produced by an image sensor associated with the camera 253. More particularly, the image sensor (not shown) is configured to produce an electronic signal in dependence on received light. That is, the image sensor converts an optical image into an electronic signal, which may be output from the image sensor by way of one or more electrical connectors associated with the image sensor. The electronic signal represents electronic image data (which may also be referred to as camera data).

In the embodiment illustrated, the electronic device 201 includes a rear facing camera 253. A rear facing camera is a camera 253 which is located to obtain images of a subject near a rear face 108 of the electronic device 201. That is, the rear facing camera may be located on or near a rear face 108 of the electronic device 201.

In other embodiments (not illustrated), the electronic device 201 may include a front facing camera instead of or in addition to the rear facing camera. A front facing camera is a camera which is located to obtain images of a subject near the front face 106 (FIG. 1) of the electronic device 201. That is, the front facing camera may be generally located at or near a front face 106 of the electronic device 201. The front facing camera may be located anywhere on the front surface of the electronic device; for example, the front facing camera may be located above or below the display 204. In at least some example embodiments, the front facing camera may be provided in a central location relative to the display 204 to facilitate image acquisition of a face. In at least some embodiments, the front facing camera may be used, for example, to allow a user of the electronic device 201 to engage in a video-based chat with a user of another electronic device 201. In at least some embodiments, the front facing camera is mounted internally within a housing of the electronic device 201 beneath a region of the front face 106 which transmits light. For example, the front facing camera may be mounted beneath a clear portion of the housing which allows light to be transmitted to the internally mounted camera.

In at least some embodiments (not shown), the electronic device 201 may include a front facing camera and also a rear facing camera. The rear facing camera may obtain images which are not within the field of view of the front facing camera. The fields of view of the front facing and rear facing cameras may generally be in opposing directions.

The electronic device 201 includes a flash 255. The flash 255 may, in at least some embodiments, be a light emitting diode (LED) flash. The flash 255 emits electromagnetic radiation. More particularly, the flash 255 may be used to produce a brief bright light which may facilitate picture-taking in low light conditions. That is, the flash 255 may emit light while an image is captured using the camera 253. In the embodiment illustrated, the flash 255 is located to emit light at the rear face 108 of the electronic device 201. That is, the flash is a rear-facing flash in the illustrated embodiment. The electronic device 201 may include a front-facing flash instead of or in addition to the rear facing flash to emit light at the front face 106 of the electronic device 201. The electronic device 201 may have additional camera hardware which may complement the camera 253.

Still referring to FIG. 2, a lens 402 covers the image sensor of the camera 253 and the flash 255. The lens allows light to pass though (e.g. from the flash 255 to the exterior of the housing or from the exterior of the housing to the image sensor) and prevents debris or dirt from entering into the housing. Dirt or debris that could otherwise enter into the housing could potentially damage the components of the camera 253 and flash 255. In the embodiment illustrated in FIG. 2 a combined camera and flash lens 402 is secured to the housing. For example, the combined camera and flash lens 402 may be secured to the housing an adhesive or using snaps or similar attachment mechanism in such a manner so as to be flush with the housing. The lens 402 can be a transparent member made out of a single piece of glass or another suitable transparent material. The lens 402 is described in more detail below.

Figure 3:
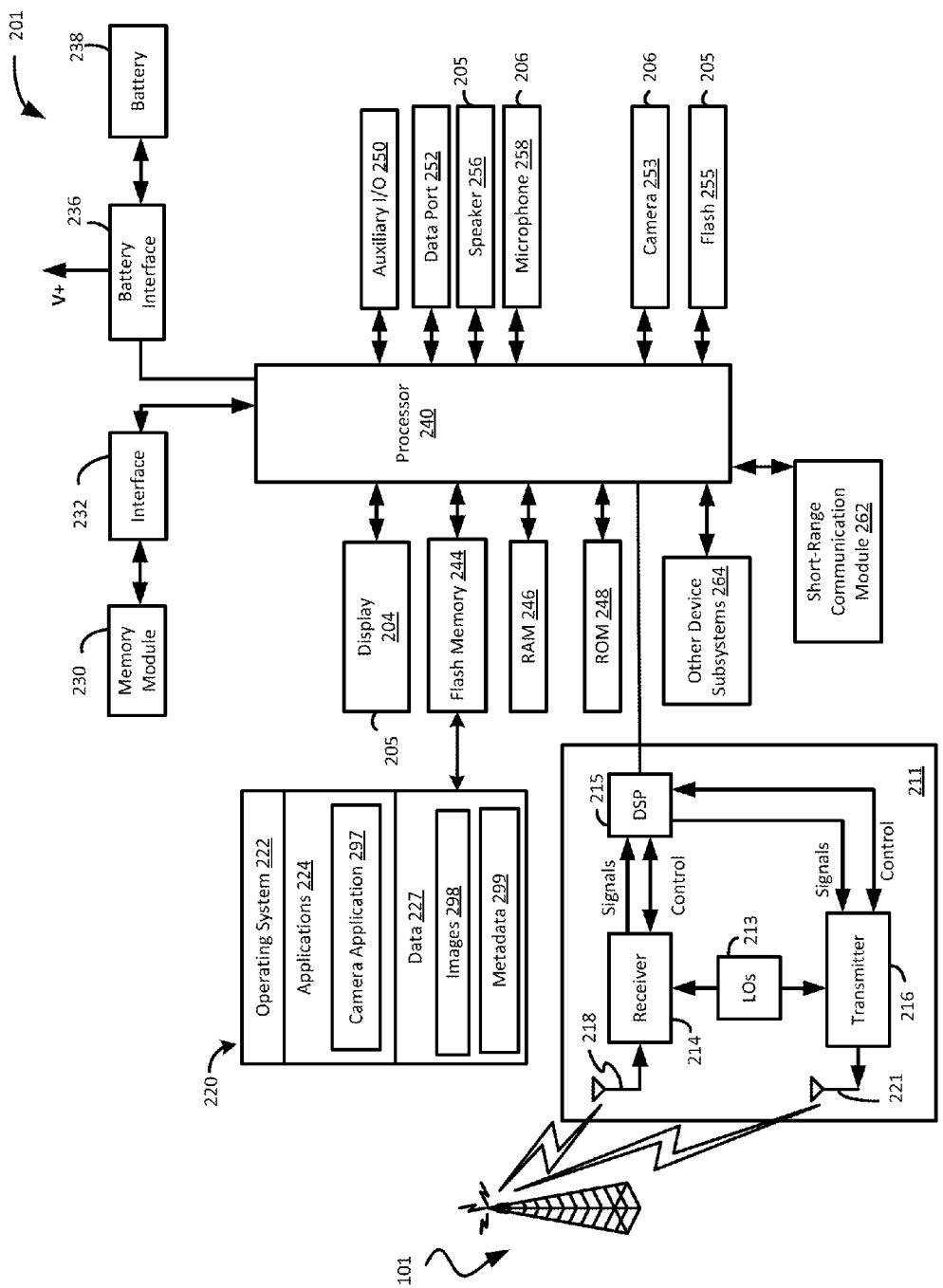
FIG. 3 is a block diagram illustrating components of the example electronic device of FIG. 1 in accordance with example embodiments of the present disclosure.

Referring now to FIG. 3, a block diagram of an example electronic device 201 is illustrated. The electronic device 201 of FIG. 3 may include a housing which houses components of the electronic device 201. Internal components of the electronic device 201 may be constructed on a printed circuit board (PCB). The electronic device 201 includes a controller including at least one processor 240 (such as a microprocessor) which controls the overall operation of the electronic device 201. The processor 240 interacts with device subsystems such as a wireless communication subsystem 211 for exchanging radio frequency signals with a wireless network 101 to perform communication functions. The processor 240 interacts with additional device subsystems including one or more input interfaces 206 (such as a keyboard, one or more control buttons, one or more microphones 258, one or more cameras 253, and/or a touch-sensitive overlay associated with a touchscreen display), flash memory 244, random access memory (RAM) 246, read only memory (ROM) 248, auxiliary input/output (I/O) subsystems 250, a data port 252 (which may be a serial data port, such as a Universal Serial Bus (USB) data port), one or more output interfaces 205 (such as a display 204 (which may be a liquid crystal display (LCD)), a flash 255, one or more speakers 256, or other output interfaces), a short range communication module 262, and other device subsystems generally designated as 264. Some of the subsystems shown in FIG. 3 perform communication-related functions, whereas other subsystems may provide "resident" or on-device functions.

The electronic device 201 may include a touchscreen display in some example embodiments. The touchscreen display may be constructed using a touch-sensitive input surface connected to an electronic controller. The touch-sensitive input surface overlays the display 204 and may be referred to as a touch-sensitive overlay. The touch-sensitive overlay and the electronic controller provide a touch-sensitive input interface 206 and the processor 240 interacts with the touch-sensitive overlay via the electronic controller. That is, the touchscreen display acts as both an input interface 206 and an output interface 205.

The communication subsystem 211 includes a receiver 214, a transmitter 216, and associated components, such as one or more antenna elements 218 and 221, local oscillators (LOs) 213, and a processing module such as a digital signal processor (DSP) 215. The antenna elements 218 and 221 may be embedded or internal to the electronic device 201 and a single antenna may be shared by both receiver 214 and transmitter 216, as is known in the art. The particular design of the wireless communication subsystem 211 depends on the wireless network 101 in which the electronic device 201 is intended to operate.

The electronic device 201 may communicate with any one of a plurality of fixed transceiver base stations of the wireless network 101 within its geographic coverage area. The electronic device 201 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 215. In a similar manner, signals to be transmitted are processed, including modulation and encoding, for example, by the DSP 215. These DSP-processed signals are input to the transmitter 216 for digital-to-analog (D/A) conversion, frequency up conversion, filtering, amplification, and transmission to the wireless network 101 via the antenna 221. The DSP 215 not only processes communication signals, but may also provide for receiver and transmitter control. For example, the gains applied to communication signals in the receiver 214 and the transmitter 216 may be adaptively controlled through automatic gain control algorithms implemented in the DSP 215.

In some example embodiments, the auxiliary input/output (I/O) subsystems 250 may include an external communication link or interface, for example, an Ethernet connection. The electronic device 201 may include other wireless communication interfaces for communicating with other types of wireless networks; for example, a wireless network such as an orthogonal frequency division multiplexed (OFDM) network.

In some example embodiments, the electronic device 201 also includes a removable memory module 230 (typically including flash memory) and a memory module interface 232. Network access may be associated with a subscriber or user of the electronic device 201 via the memory module 230, which may be a Subscriber Identity Module (SIM) card for use in a GSM network or other type of memory module for use in the relevant wireless network type. The memory module 230 may be inserted in or connected to the memory module interface 232 of the electronic device 201.

The electronic device 201 may store data 227 in an erasable persistent memory, which in one example embodiment is the flash memory 244. In various example embodiments, the data 227 may include service data having information required by the electronic device 201 to establish and maintain communication with the wireless network 101. The data 227 may also include user application data such as email messages, address book and contact information, calendar and schedule information, notepad documents, images 298, and other commonly stored user information stored on the electronic device 201 by its user, and other data. The data 227 may, in at least some embodiments, include metadata 299 which may store information about the images 298. While the metadata 299 is illustrated separately from the images 298, in some embodiments, the metadata 299 and the images 298 may be stored together. That is, a single file may include both an image 298 and also metadata 299 regarding that image. For example, in at least some embodiments, the image may be formatted and stored as a JPEG image.

The data 227 stored in the persistent memory (e.g. flash memory 244) of the electronic device 201 may be organized, at least partially, into a number of databases or data stores each containing data items of the same data type or associated with the same application. For example, email messages, contact records, and task items may be stored in individual databases within the electronic device 201 memory.

The data port 252 may be used for synchronization with a user's host computer system. The data port 252 enables a user to set preferences through an external device or software application and extends the capabilities of the electronic device 201 by providing for information or software downloads to the electronic device 201 other than through the wireless network 101. The alternate download path may for example, be used to load an encryption key onto the electronic device 201 through a direct, reliable and trusted connection to thereby provide secure device communication.

In some example embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable Bluetooth® connection to the host computer for processing.

The electronic device 201 also includes a battery 238 as a power source, which is typically one or more rechargeable batteries that may be charged, for example, through charging circuitry coupled to a battery interface 236 such as the serial data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The short range communication module 262 provides for communication between the electronic device 201 and different systems or devices, which need not necessarily be similar devices. For example, the short range communication module 262 may include an infrared device and associated circuits and components, or a wireless bus protocol compliant communication mechanism such as a Bluetooth® communication module to provide for communication with similarly-enabled systems and devices.

In the embodiment illustrated, the camera 253 is illustrated as being coupled directly with a main processor 240 which controls the camera. In at least some embodiments, the camera 253 may include a dedicated image signal processor which may provide at least some camera-related functions. For example, in at least some embodiments, the image signal processor of the camera 253 may be configured to provide auto-focusing functions. Functions or features which are described below with reference to the camera application 297 may, in at least some embodiments, be provided, in whole or in part, by the image signal processor.

The electronic device 201 also includes a flash 255. As noted above, the flash 255 is used to illuminate a subject while the camera 253 captures an image of the subject. The flash 255 may, for example, be used in low light conditions. In the example embodiment illustrated, the flash 255 is coupled with the main processor 240 of the electronic device 201. However, in other embodiments, the flash 255 may be coupled to an image signal processor (not shown) of the camera 253 which may be used to trigger the flash. The image signal processor may, in at least some embodiments, control the flash 255. In at least some such embodiments, applications associated with the main processor 240 may be permitted to trigger the flash 255 by providing an instruction to the image signal processor to instruct the image signal processor to trigger the flash 255.

A predetermined set of applications that control basic device operations, including data and possibly voice communication applications may be installed on the electronic device 201 during or after manufacture. Additional applications and/or upgrades to an operating system 222 or software applications 224 may also be loaded onto the electronic device 201 through the wireless network 101, the auxiliary I/O subsystem 250, the data port 252, the short range communication module 262, or other suitable device subsystems 264. The downloaded programs or code modules may be permanently installed; for example, written into the program memory (e.g. the flash memory 244), or written into and executed from the RAM 246 for execution by the processor 240 at runtime.

In some example embodiments, the electronic device 201 may provide two principal modes of communication: a data communication mode and a voice communication mode. In the data communication mode, a received data signal such as a text message, an email message, or webpage download will be processed by the communication subsystem 211 and input to the processor 240 for further processing. For example, a downloaded webpage may be further processed by a web browser or an email message may be processed by the email messaging application and output to the display 204. A user of the electronic device 201 may also compose data items, such as email messages; for example, using an input interface 206 in conjunction with the display 204. These composed items may be transmitted through the communication subsystem 211 over the wireless network 101.

In the voice communication mode, the electronic device 201 provides telephony functions and may operate as a typical cellular phone. The overall operation is similar to the data communication mode, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input devices). Alternative voice or audio I/O subsystems, such as a voice message recording subsystem, may also be implemented on the electronic device 201. Although voice or audio signal output may be accomplished primarily through the speaker 256, the display 204 may also be used to provide an indication of the identity of a calling party, duration of a voice call, or other voice call related information.

The processor 240 operates under stored program control and executes software modules 220, such as applications 224, stored in memory such as persistent memory; for example, in the flash memory 244. As illustrated in FIG. 3, the software modules 220 may include operating system software 222 and one or more additional applications 224 or modules such as, for example, a camera application 297. The processor 240 may also operate to process data 227 stored in memory associated with the electronic device 201.

In the example embodiment of FIG. 3, the camera application 297 is illustrated as being implemented as a stand-alone application 224. However, in other example embodiments, the camera application 297 could be provided by another application or module such as, for example, the operating system software 222. Further, while the camera application 297 is illustrated with a single block, the functions or features provided by the camera application 297 could, in at least some embodiments, be divided up and implemented by a plurality of applications and/or modules.

The camera application 297 may, for example, be configured to provide a viewfinder on the display 204 by displaying, in real time or near real time, an image defined in the electronic signals received from the camera 253. The camera application 297 may also be configured to capture an image or video by storing an image or video defined by the electronic signals received from the camera 253. For example, the camera application 297 may be configured to store an image 298 or video to memory of the electronic device 201.

The camera application 297 may also be configured to control options or preferences associated with the camera 253. For example, the camera application 297 may be configured to control a camera lens aperture and/or a shutter speed. The control of such features may, in at least some embodiments, be automatically performed by the camera software based on output received from a light exposure meter.

In at least some embodiments, the camera application 297 may be configured to focus the camera 253 on a subject. For example, the camera application 297 may be configured to control an actuator of the camera 253 to move a lens (which is comprised of one or more lens elements) in the camera 253 relative to an image sensor in the camera 253. For example, when capturing images of subjects which are very close to the camera 253 (e.g. subject at macro position), the camera application 297 may control the actuator to cause the actuator to move the lens away from the image sensor.

In at least some embodiments, the camera application 297 may provide for auto-focusing capabilities. For example, the camera application 297 may analyze received electronic signals to determine whether the images captured by the camera are in focus. That is, the camera application 297 may determine whether the images defined by electronic signals received from the camera 253 are focused properly on the subject of such images. The camera application 297 may, for example, make this determination based on the sharpness of such images. If the camera application 297 determines that the images are not in focus, then the camera application 297 may cause the processor to adjust the actuator which controls the lens to focus the image.

In at least some embodiments, the camera application 297 may be configured to control a flash associated with the camera 253 and/or to control a zoom associated with the camera 253. In at least some embodiments, the camera application 297 is configured to provide digital zoom features. The camera application 297 may provide digital zoom features by cropping an image down to a centered area with the same aspect ratio as the original. In at least some embodiments, the camera application 297 may interpolate within the cropped image to bring the cropped image back up to the pixel dimensions of the original. The camera application 297 may, in at least some embodiments, provide image stabilization for the camera. Image stabilization may reduce blurring associated with movement of the camera 253.

In at least some embodiments, the metadata 299 designating an image as either a primary image or a secondary image may be used when displaying images. For example, in at least some embodiments, the camera application 297 may provide a slideshow mode in which a slideshow of images may be displayed on a display of the electronic device. The slideshow may exclude images designated as secondary images until a command to toggle to a secondary image is received via an input interface 206 while an image designated as a primary image is displayed. In response to receiving such an input, the camera application 297 may cause the secondary image which is associated with the displayed primary image (i.e. the secondary image which was captured at approximately the same time as the displayed primary image) to be displayed. That is, in the slideshow mode, the electronic device 201 may only display primary images unless a specific instruction is received instructing the electronic device to display a secondary image.

The software modules 220 or parts thereof may be temporarily loaded into volatile memory such as the RAM 246. The RAM 246 is used for storing runtime data variables and other types of data or information. Although specific functions are described for various types of memory, this is merely one example, and a different assignment of functions to types of memory could also be used.

Example Combined Camera and Flash Lens

Light that emanates from the flash 255 can be used to illuminate a subject while the camera 253 captures the image of the subject. For example, light from the flash 255 reflects off the subject and is received at the image sensor associated with the camera 253. The image sensor can be attached to the camera 253 for example. Unwanted light can emanate from the flash 255 and cause interference with the image sensor or with light received at the image sensor, which can negatively affect the quality of image or video captured by the camera 253. For example, light emanating from the flash 255 can appear as a reflection or glare on images or video captured by the camera 253. The severity of the effect of this interference or crosstalk is often directly related to the distance between the flash 255 and the image sensor on the electronic device 201 or associated with the camera 253. Such interference can be worse if there is a clear or transparent path between the flash 255 and the image sensor through which light can travel. For example, if a single transparent lens is used to cover both the image sensor and flash 255 then there may be a path in the glass lens through which light can travel (or be reflected) from the flash 255 to the image sensor thus causing interference with the light otherwise received at the image sensor. As detailed below, a combined camera and flash lens with an etched portion may be used to counteract, minimize or limit the interference problem.

Figure 4:
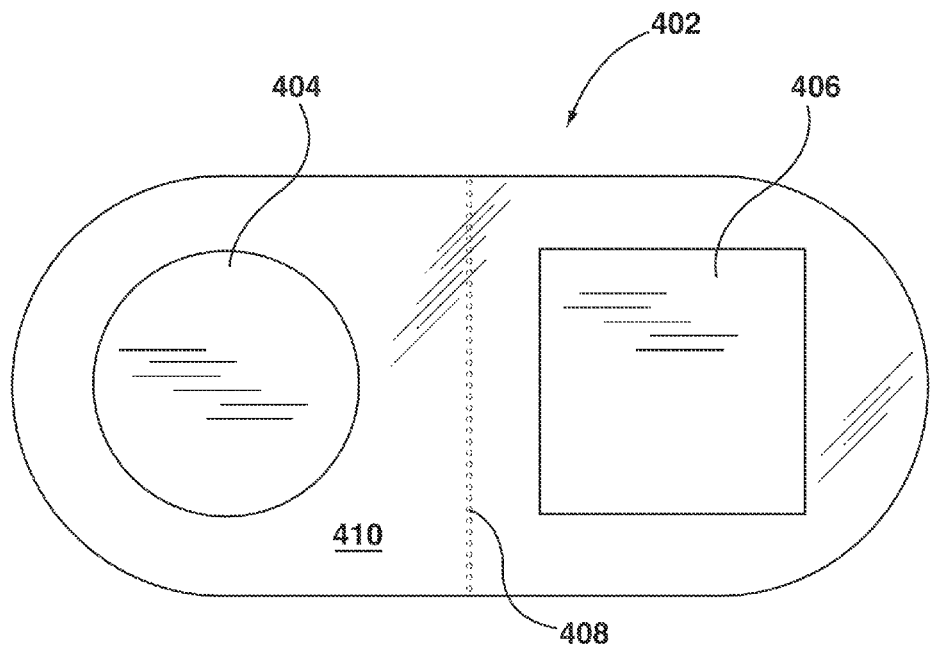
FIG. 4 is a bottom view of an example combined camera and flash lens.

FIG. 4 illustrates an exemplary combined camera and flash lens 402 in isolation. The combined lens 402 has a flash portion 404, an image sensor portion 406, an etching 408 and a mask 410. The flash portion 404 is for covering the flash and is transparent to allow light from the flash 255 to pass through. The image sensor portion 406 is for covering the image sensor and is also transparent to allow light to pass through into the image sensor associated with the camera 253.

Figure 5:
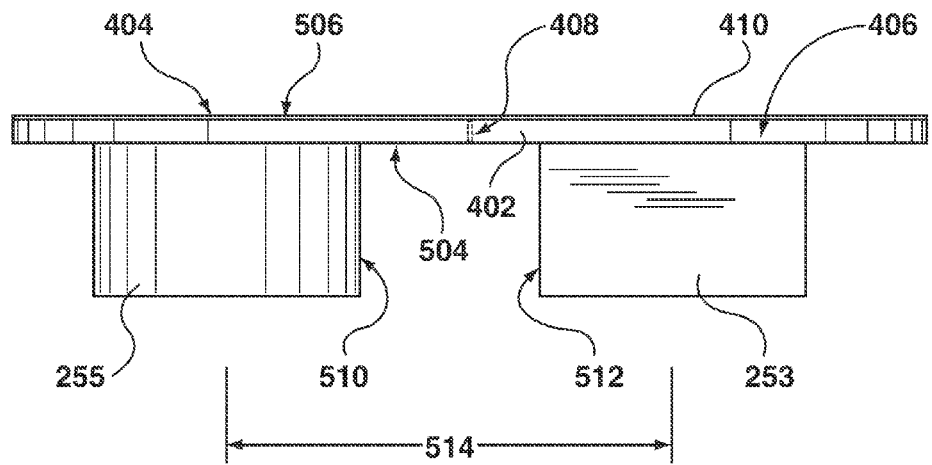
FIG. 5 is a side elevation view of an example combined camera and flash lens with a flash and camera.

The combined lens 402 can be mounted on or contained inside of the housing of the electronic device 201. When the lens 402 is mounted on or contained inside of the housing, the image sensor portion 406 of the lens 402 is configured to cover the image sensor. Similarly, when the lens 402 is mounted on or contained inside of the housing, the flash portion 404 of the lens 402 is configured to cover the flash 255. For example, when the combined lens 402 is mounted on or contained inside the housing, the lens 402 is positioned such that the flash portion 404 covers the flash 255 and the image sensor portion 406 covers the image sensor (as shown in FIG. 5, described below). The flash portion 404 and the image sensor portion 406 on the combined lens 402 are configured to align with the flash 255 and image sensor, respectively, when the lens 402 is in use or when it is secured to the housing.

In accordance with the example embodiment illustrated in FIG. 2 when the lens 402 is mounted to the housing, the flash portion 404 of the lens 402 is aligned with the flash so as to allow light to pass therethrough, and the image sensor portion 406 is aligned with the image sensor to allow light to pass therethrough. The lens 402 can be connected to the housing such that the lens extends from one side of the housing to the other. Or, in an alternative embodiment, the lens may cover the flash 255 and image sensor but may not extend to either side of the housing. In a further embodiment, the lens 402 may cover a majority of the rear face 108 (or front face 106, as the case may be) of the electronic device 201. The lens 402 can be mounted to the housing such that the outer surface of the lens 402 (or the mask 410 if the mask is attached to the outer surface of the lens) is flush with the outer surface of the housing (i.e. the rear face 108 in the case of a rear facing camera 253). In a further embodiment, the lens 402 is not supported by the housing. For example, the lens 402 may be supported by the camera 253 and/or the flash 255 or another component of the electronic device 201.

In one or more embodiments, there may be additional lens elements underneath the lens 402 that may be between the image sensor and image sensor portion 406. For example, the additional lens elements may be associated with or attached to the camera and controlled by an actuator, as described above.

In an alternative embodiment, the combined lens 402 can be contained within the housing such that a first opening in the housing aligns with the image sensor portion 406 of the lens and a second opening in the housing aligns with the flash portion 404. Similarly, the image sensor and the flash 255 can also be aligned with the first and second openings in the housing, respectively, so that light can pass through the first and second openings in the housing and through the flash portion 404 and image sensor portion 406 of the combined lens 402. In such an embodiment, the mask 410 and the portion of the lens 402 that does not include the flash portion 404 and the image sensor portion 406 may be contained within the housing. In further embodiments, there is an adhesive seal on the lens for securing the lens 402 to the interior of the housing.

In an embodiment, the mask 410 is secured to a surface of the lens 402. For example, the mask 410 can be printed on a surface of the lens 402 using a screen printing process or can be attached to the lens 402 in another manner. The mask 410 can be a thin, pliable or resilient sheet of plastic (e.g. thinner than the lens 402) and is not transparent. For example, the mask 410 can be a dark colour (e.g. black, brown, etc.) so as to prevent or limit light from passing through. In one or more embodiments, the mask 410 defines a flash opening and an image sensor opening. When the mask 410 is secured to the lens 402, the flash opening is aligned with the flash portion 404 of the lens such that the mask does not prohibit, limit or block light from passing through the flash portion 404. Similarly, when the mask 410 is secured to the lens 402, the image sensor opening is aligned with the image sensor portion 406 such that the mask does not prohibit, limit or block light from passing through the image sensor portion 406.

In one or more embodiments, there is no mask 410 attached or secured to the lens 402. In an alternative embodiment, a portion of the lens (not including the flash portion and the image sensor portion) is tinted. For example, there can be up to a 5% tint on the lens 402.

The shape of the image sensor portion 406 can be different than that of the remainder of the combined lens 402 to accommodate the lens requirements for the image sensor. Similarly, the shape of the flash portion 404 can also be different from the shape of the remainder of the combined lens 402 in order to accommodate the needs of the flash 255. For example, in an embodiment, the image sensor portion 406 and/or the flash portion 404 are concave and the remainder of the combined lens 402 is generally planar. Similarly, the arc of the curve of the flash portion 404 can be different from the arc of the curve of the image sensor portion 406, which can also be different from the arc of the curve of the lens 402.

With reference to FIG. 5, the lens 402 has a bottom surface 504 and a top surface 506. In the embodiment illustrated in the figures, the mask 410 is secured to the top surface 506. It is recognized that in other embodiments, the mask 410 may be secured to the bottom surface 504 or may not be present at all. For example, the lens 402 can be laser printed on to the bottom surface 504 of the lens 402. The bottom surface 504 of the lens 402 is proximal to the flash 255 and the camera 253 (which includes the image sensor) when the lens 402 is secured to or on the housing. The lens 402, flash 255 and camera 253 can be configured such that the flash portion 404 forms a lens for the flash 255 and the image sensor portion 406 forms a lens for the image sensor (which is part of the camera 253). For example, the flash portion 404 allows light to pass from the flash 255 to exterior of the housing and electronic device 201. Similarly, the image sensor portion 406 of the lens 402 allows light to pass from the exterior of the electronic device 201 to the image sensor.

The flash 255 has a flash section 510 proximal the image sensor and the image sensor has an image sensor section 512 that is proximal the flash 255. The flash section 510 is the point on the flash 255 that is closest to the image sensor. Similarly, the image sensor section 512 is the point on the image sensor that is closest to the flash 255. The distance between the image sensor section 512 and the flash section 510 is intended to measure the distance, generally, between the flash 255 and the image sensor. The distance between the flash section 510 and the image sensor section 512 is the in the range of 1 to 3 millimeters. Further, the distance 514 between the center of the flash 255 and the center of the image sensor is in the range of 7 to 15 millimeters. In some embodiments when the distance 514 between the center of the image sensor and the center of the flash 255 is greater than 15 millimeters, the light emanating from the flash 255 does not interfere with the image sensor.

The etching 408 can be formed in the combined lens 402 using a laser, for example, and can be formed in the lens 402 before the lens is secured to or in the housing.

Figure 6:
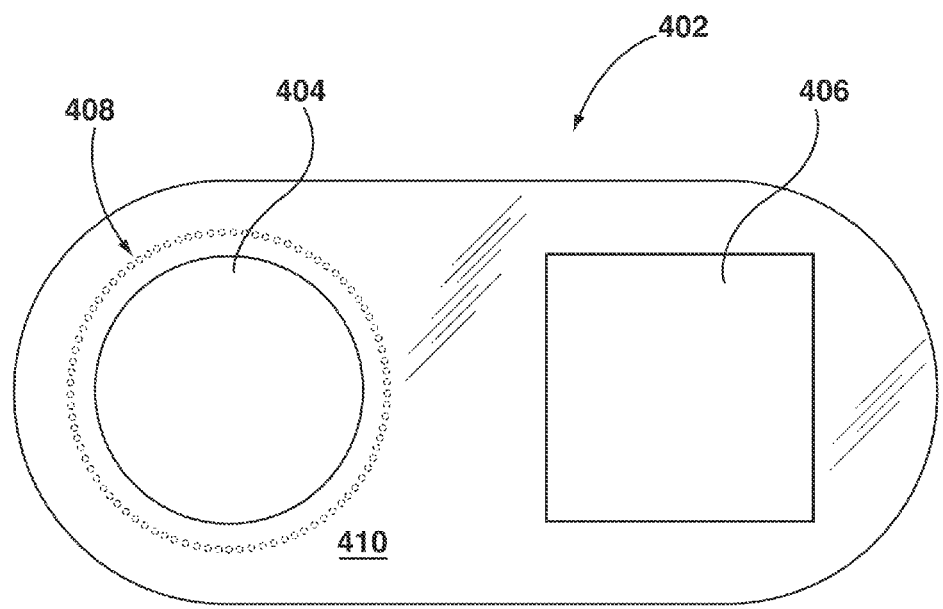
FIG. 6 is a bottom view of an example combined camera and flash lens.

The etching 408 is formed in the lens 402 in a position that is adjacent to the flash portion 404. According to different embodiments, the etching 408 can be shaped into different patterns and can have different configurations in relation to the combined lens 402. For example, as shown in FIG. 4, the etching 408 can form a boundary between the flash portion 404 and the image sensor portion 406 by running between two edges of the lens 402. The etching 408 is shown as a straight line in FIG. 4, however the etching 408 can be other than a straight line (e.g. the etching 408 can be a curved line, or another shape such as a circle or rectangle). In another embodiment, with reference to FIG. 6, the etching 408 surrounds or encircles the flash portion 404. It is understood that the etching 408 need not entirely surround the flash potion 404. For example, the etching 408 can form a partial circle, or arc, around a part of the flash portion 404. In another embodiment, the etching 408 surrounds or encircles the image sensor portion 406. It is understood that the etching 408 need not entirely surround the image sensor potion 406. For example, the etching 408 can form a partial circle, or arc, around a part of the image sensor potion 406.

Figure 7:
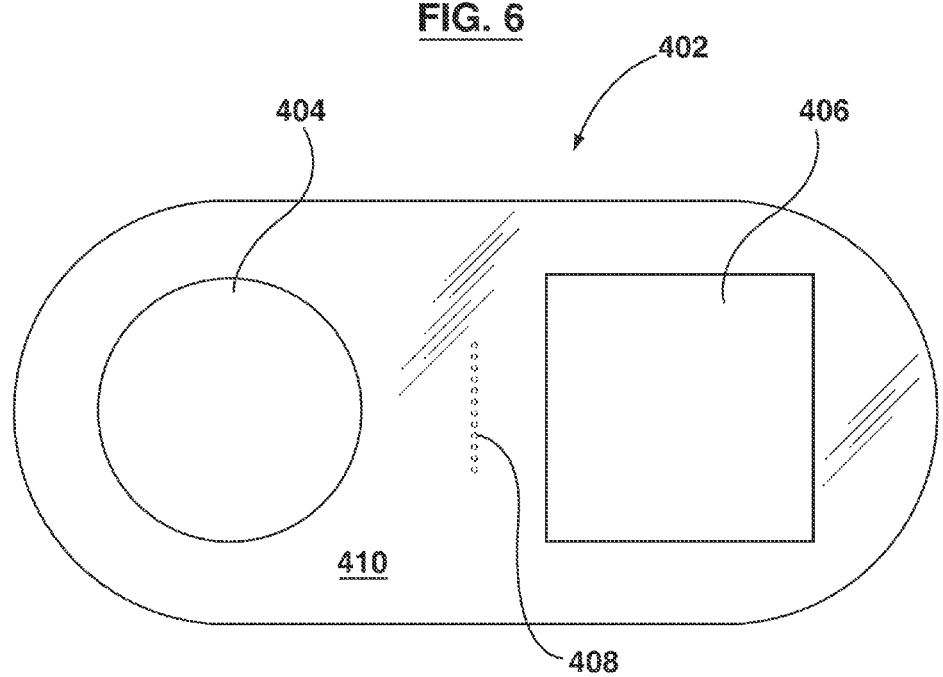
FIG. 7 is a bottom view of an example combined camera and flash lens.

In another embodiment, shown in FIG. 7, the etching 408 forms a partial boundary between the flash portion 404 and the image sensor portion 406. The partial boundary can define a line (as in FIG. 7), a circle, a curve, or another pattern or shape. It is recognized that there are many other configurations, positions, shapes and patterns that the etching 408 can define in the lens 402.

It is recognized that there can be more than one etching 408 in the lens 402. For example, in an embodiment the etching 408 comprises a first etching and a second etching with the first etching surrounding the flash portion 404 and the second etching surrounding the image sensor portion 406. It is understood that the first etching and second etching can have different shapes or patterns. For example, the first etching can surround the flash portion 404 (e.g. with a circle shape) with the second etching defining a boundary or a line between the flash portion 404 and the image sensor portion 406.

In an embodiment, the lens has a thickness of between 1 millimeter and 1.5 millimeters. It is understood that variations on the dimensions, thickness and configuration of the lens may be used.

In an embodiment the combined lens is made out of single piece of glass.

Figure 8:
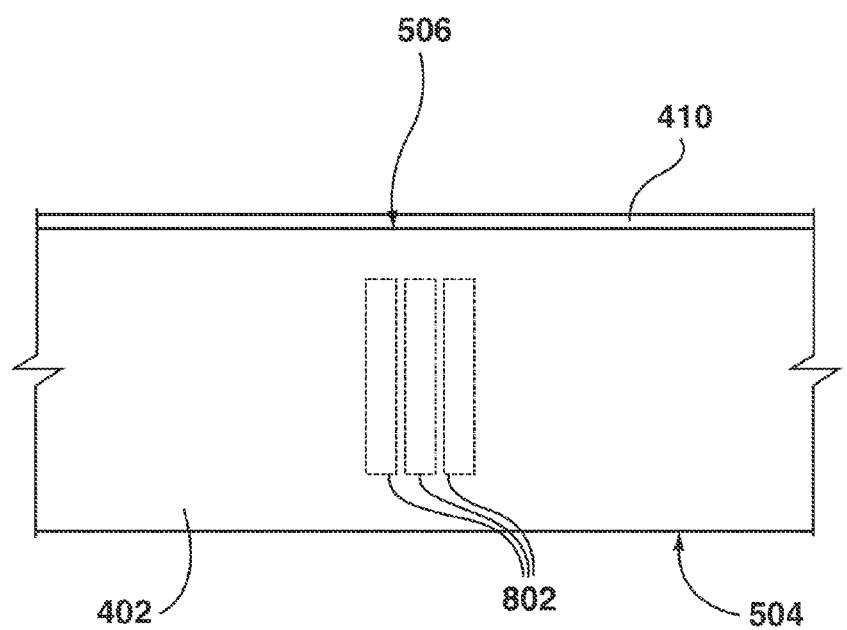
FIG. 8 is an isometric view of an example combined camera and flash lens.
Figure 9:
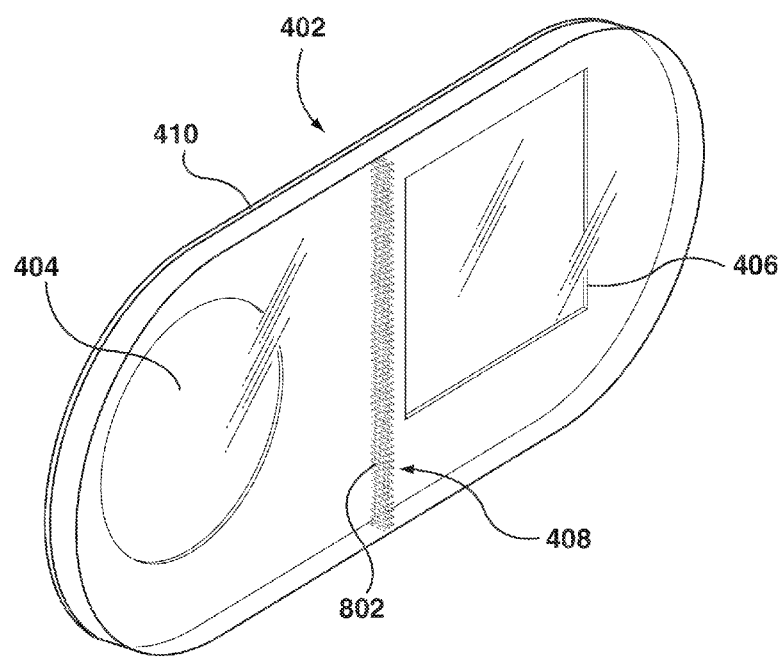
FIG. 9 is a side elevation view of a section of the combined lens of FIG. 8.

Etching a glass lens (such as an embodiment of the combined lens 402) can be performed using a computer guided laser. Etching glass with such a laser can result in void spaces or pores or vacuums in the glass. In accordance with an embodiment, illustrated in FIG. 8, the etching 408 in the combined lens 402 defines one or more void spaces 802 within the lens 402. Each void space 802 is a pore or space interior of the glass and that is entirely surrounded by or sealed in by the glass. The void spaces 802 formed in the combined lens can be in the shape of columns, for example. The void spaces 802 in the lens 402 illustrated in FIG. 8 defines three parallel lines. Each line comprises a series of void spaces 802, defined by the etching 408. It is recognized that, as described in reference to FIGS. 4, 6, and 7, the etching can define different patterns and need not comprise three parallel lines. For example the etching 408 can define one line, one circle surrounding the flash portion 404, one circle surrounding the image sensor portion 406 or a variety of other shapes. FIG. 9 illustrates a close up view of void spaces 802 of FIG. 8 shown from a side elevation view. Each of the three lines of void spaces 802 are spaced apart. In one or more alternative embodiments, the etching of the combined lens 402 can result in one or more holes (e.g. a series of holes) in the lens 402. For example, one or more holes can extend from the top surface 506, through the lens 402 to the bottom surface 504.

Light emanating from the flash 255 can be dispersed or controlled by the etching 408. Thus, the etching 408 can limit, minimize, prevent or reduce the amount of light emanating from the flash 255 that passes through the combined lens 402 and interferes with the light received at the image sensor.

It is further recognized that other methods of etching the lens 402 can be used to etch an external surface of the lens 402, such as cutting or etching using diamonds, water or sand. Etching the external surface of the lens 402 can limit transmission of light through the bottom or top surface of the lens 402, thus assisting in limiting interference with the image sensor.

According to another embodiment, a camera assembly is disclosed. The camera assembly comprises a flash 255, an image sensor and a combined lens 402. The camera assembly also comprises a housing for housing the flash 255, the image sensor and the lens 402 such that the flash portion 404 of the lens is aligned with the flash 255 and the image sensor portion 406 of the lens is aligned with the image sensor. For example, the lens 402 can be secured to the interior or exterior of the housing adhesive, snaps or other methods of attachment. Similarly, the flash 255 and image sensor can be secured within the housing. The housing can have one or more openings where the lens 402 is secured such that light can pass through the lens and into the image sensor or out of the flash 255. Together, the lens 402, flash 255 and image sensor can form an operable camera housed in the housing.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is the following:

1. An electronic device, comprising:
    an image sensor;
    a flash;
    a lens having a flash portion for covering the flash, an image sensor portion for covering the image sensor and a laser etching for reducing optical interference at the image sensor from the flash; and,
    a housing for housing the image sensor and the flash.

2. The electronic device of claim 1, wherein the housing defines a first opening and a second opening, and wherein the lens is configured such that the flash portion is aligned with the first opening for allowing light to pass therethrough and the image sensor portion is aligned with the second opening for allowing light to pass therethrough.

3. The electronic device of claim 1, wherein the lens is supported by the housing.

4. The electronic device of claim 1, wherein the laser etching is adjacent the flash portion.

5. The electronic device of claim 1, wherein the laser etching is between the image sensor portion and the flash portion.

6. The electronic device of claim 1, wherein the laser etching surrounds one of the flash portion and image sensor portion.

7. The electronic device of claim 1, wherein the laser etching comprises a first etching and a second etching, the first etching surrounding the flash portion and the second etching surrounding the image sensor portion.

8. The electronic device of claim 1, wherein the distance between the center of the image sensor and the center of the flash is in the range of 7 millimeters to 15 millimeters.

9. The electronic device of claim 1, wherein the laser etching defines at least one void space in the lens.

10. The electronic device of claim 1, further comprising a mask having a flash opening and an image sensor opening, the mask secured to the lens such that the flash opening is aligned with the flash portion and the image sensor opening is aligned with the image sensor portion.

11. A lens for a camera, the camera having a flash and an image sensor, the lens comprising:

a flash portion for covering the flash, an image sensor portion for covering the image sensor and a laser etching for reducing optical interference at the image sensor from the flash.

12. The lens of claim 11, wherein the laser etching is adjacent the flash portion.

13. The lens of claim 11, wherein the laser etching is between the image sensor portion and the flash portion.

14. The lens of claim 11, wherein the laser etching surrounds one of the flash portion and image sensor portion.

15. The lens of claim 11, wherein the laser etching comprises a first etching and a second etching, the first etching surrounding the flash portion and the second etching surrounding the image sensor portion.

16. The lens of claim 11, wherein the distance between the center of the image sensor and the center of the flash is in the range of 7 millimeters to 15 millimeters.

17. The lens of claim 11, wherein the laser etching defines at least one void space in the lens.

18. The lens of claim 11, further comprising a mask defining a flash opening and an image sensor opening, the mask secured to the lens such that the flash opening is aligned with the flash portion and the image sensor opening is aligned with the image sensor portion.

19. A camera assembly, comprising:
a flash;
an image sensor; and,
a lens including a flash portion that covers the flash, an image sensor portion that covers the image sensor and a laser etching to reduce optical interference at the image sensor from the flash.

* * * * *